US 7,975,877 B2

(12) United States Patent
Garthaffner et al.

(10) Patent No.: US 7,975,877 B2
(45) Date of Patent: Jul. 12, 2011

(54) BEAD FEEDER

(75) Inventors: Martin T. Garthaffner, Chesterfield, VA (US); Travis M. Garthaffner, Midlothian, VA (US); George R. Scott, Midlothian, VA (US); Jeremy J. Straight, Midlothian, VA (US); James D. Evans, Chesterfield, VA (US); David Goldstein, Chester, VA (US); Martin Heidorn, Chesterfield, VA (US)

(73) Assignee: Philip Morris USA Inc., Richmond, VA (US)

( * ) Notice: Subject to any disclaimer, the term of this patent is extended or adjusted under 35 U.S.C. 154(b) by 534 days.

(21) Appl. No.: 12/182,410

(22) Filed: Jul. 30, 2008

(65) Prior Publication Data

US 2009/0039102 A1    Feb. 12, 2009

Related U.S. Application Data

(60) Provisional application No. 60/955,067, filed on Aug. 10, 2007.

(51) Int. Cl.
*B65H 3/08* (2006.01)

(52) U.S. Cl. ........ 221/211; 221/175; 221/176; 221/177; 221/178; 221/179; 221/181; 221/188; 221/189; 221/265; 221/278

(58) Field of Classification Search ............... 221/175, 221/176, 177, 178, 179, 181, 188, 189, 211, 221/265, 278
See application file for complete search history.

(56) References Cited

U.S. PATENT DOCUMENTS

| | | | | |
|---|---|---|---|---|
| 3,640,428 A * | 2/1972 | Knapp | ........................... | 221/211 |
| 3,757,995 A * | 9/1973 | Armstrong | ..................... | 221/211 |
| 3,775,034 A * | 11/1973 | Knapp | ........................... | 221/211 |
| 4,394,933 A * | 7/1983 | Ackley | ........................... | 221/211 |
| 7,757,835 B2 * | 7/2010 | Garthaffner et al. | ........... | 221/265 |
| 2004/0020554 A1 | 2/2004 | Smith et al. | | |
| 2004/0030554 A1 * | 2/2004 | Boxberger-Oberoi et al. | ............................ | 704/260 |
| 2005/0070409 A1 | 3/2005 | Deal | | |
| 2006/0135335 A1 | 6/2006 | Dawson et al. | | |
| 2007/0068540 A1 | 3/2007 | Thomas et al. | | |

* cited by examiner

*Primary Examiner* — Timothy R Waggoner
(74) *Attorney, Agent, or Firm* — Connolly Bove Lodge & Hutz LLP

(57) ABSTRACT

A bead feeder for serially delivering beads to a downstream location comprises a bead supply wheel which rotates about a vertical axis. The bead supply wheel includes a bead supply bowl and a plurality of radially arranged channels below the bowl connected to rotate with the bowl. Discharge openings in the bowl are in alignment with the radially arranged channels to delivery beads to those channels, and a bead receiving pocket is positioned at the outer end of each channel. A transfer wheel picks up beads from the bead receiving pockets and transfers those beads to a delivery wheel by vacuum transfer and release. The delivery wheel serially delivers the beads to the downstream location.

7 Claims, 3 Drawing Sheets

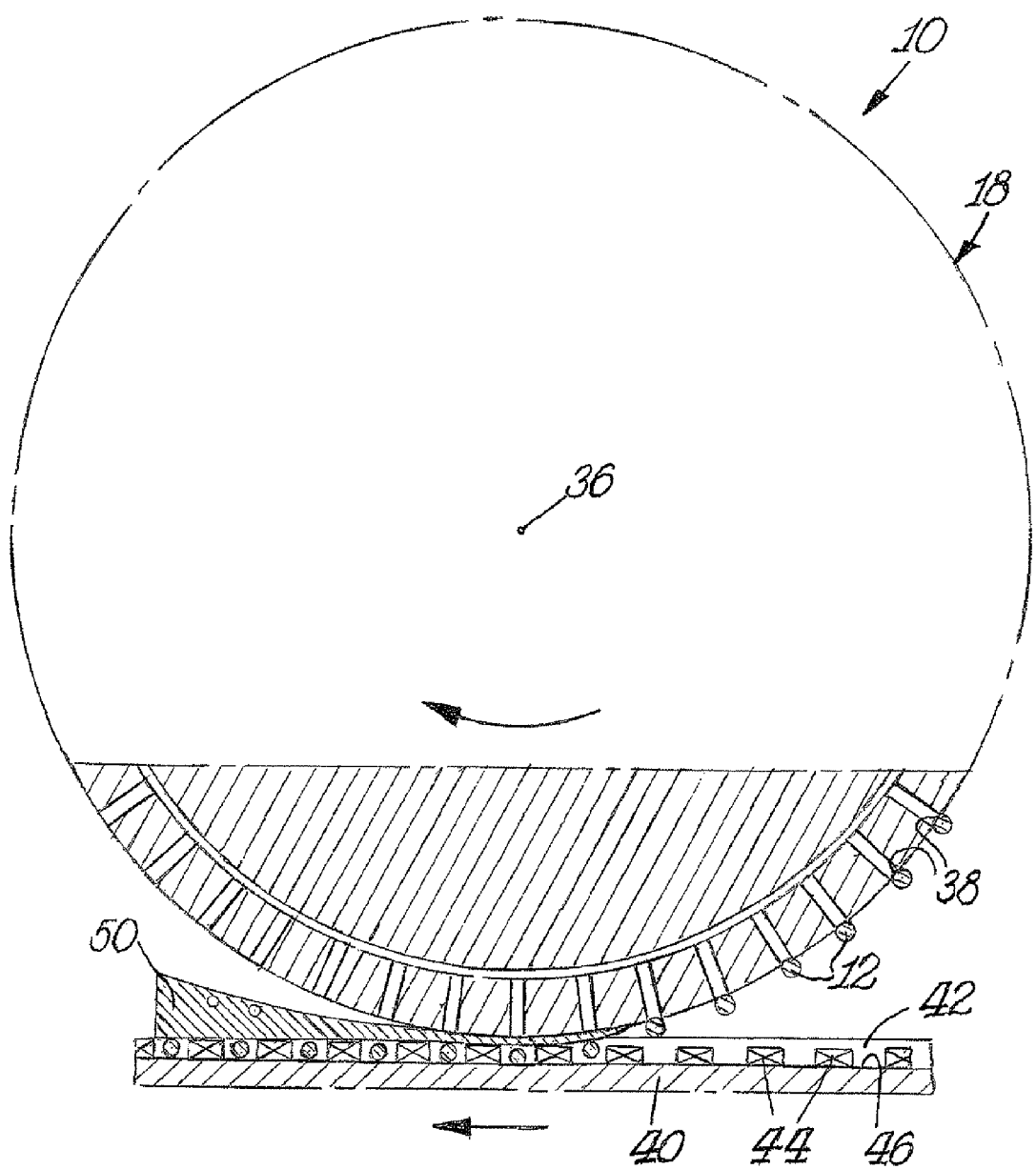

BEAD FEEDER

CROSS REFERENCE RELATED TO APPLICATION

The present application claims the benefit of provisional application Ser. No. 60/955,067, filed Aug. 10, 2007, for all useful purposes, and the specification and drawings thereof are included herein by reference.

BACKGROUND OF THE INVENTION

The present invention relates to bead feeder, and more particularly to a machine the feeds generally spherical beads from a bulk supply to a downstream location such as the interior space of a plug-space-plug cigarette filter during filter production.

A variety of cigarette filters have been proposed over the years, and many of these filters include granular filter materials particularly in so-called plug-space-plug filter arrangements. In these filter arrangements spaced apart plugs, usually made of cellulose acetate, define a cavity or space therebetween which is filled with granulated material, such as granulated carbon as well as other materials. For example, beaded material has also been proposed for introduction into the space of a plug-space-plug filter arrangement. The actual filing of the space may be in a horizontal manner and in other instances the filling operation is vertically oriented. Also, as an alternative to a charge of granules or beads, larger beads may be fed to the space between the cellulose acetate plugs, with one bead introduced into each space or cavity.

SUMMARY OF THE INVENTION

Accordingly, one of the objects of the present invention is a bead feeder that functions to serially delivery beads from a bulk supply to a downstream location in a highly efficient manner.

Another object of the present invention is a bead feeder that transports beads from a bulk supply to a space or cavity in a cigarette filter during filter production.

Still another object of the present invention is a bead feeder which operates at a high speed in a simple and trouble free manner.

In accordance with the present invention, a bead feeder comprises a bead supply wheel connected to rotate about a substantially vertical axis. The bead supply wheel includes a bead supply bowl with a plurality of radially arranged channels below the bowl, but connected to rotate with the bowl. The bowl includes a plurality of discharge openings spaced around a lower portion of the bowl, and each opening is in alignment with one of radially arranged channels. A bead receiving pocket at the outer end of each channel receives an individual bead.

The bead feeder further includes a transfer wheel connected to rotate about a substantially horizontal axis, and the transfer wheel has a plurality of bead transfer pockets on its outer surface constructed and arranged to register with the bead receiving pockets on the bead supply wheel as the supply wheel and the transfer wheel rotate about their respective axes. Vacuum is connected to select bead transfer pockets to effect transfer of the beads from the bead supply wheel to the transfer wheel.

The bead feeder also includes a delivery wheel connected to rotate about a substantially horizontal axis parallel to the axis of the transfer wheel for receiving beads from the transfer wheel and serially delivering the beads to a downstream location.

In one application on the present invention, a moving garniture is in alignment with and directly below the delivery wheel. The garniture transports filter paper with equally spaced apart plugs on the paper, and the downstream location to which the beads are delivered comprises the spaces or cavities between the plugs. The delivery wheel delivers a single bead to each such cavity.

The bead feeder of the present invention includes a plurality of bead delivery pockets on the outer surface of the delivery wheel and these pockets register with the bead transfer pockets on the bead transfer wheel as the transfer wheel and the bead delivery wheel rotate about their respective axes.

The bead delivery wheel preferably includes vacuum connected to selected bead delivery pockets to effect delivery of the beads of the transfer wheel to the bead delivery wheel. A stationary stripper adjacent the bead delivery wheel functions to remove beads from the delivery wheel.

BRIEF DESCRIPTION OF THE DRAWINGS

Novel features and advantages of the present invention in addition to those mentioned above will be readily apparent to persons of ordinary skill in the art from a reading of the following detailed description in conjunction with the accompanying drawings wherein similar reference characters refer to similar parts and in which:

FIG. 3 is a front elevational view of the delivery wheel of the bead feeder shown in FIGS. 1 and 2, with portions thereof in section illustrating delivery of individual beads from the wheel to the cavities or spaces between spaced apart plugs during cigarette filter production.

DETAILED DESCRIPTION OF THE INVENTION

Figure 1:
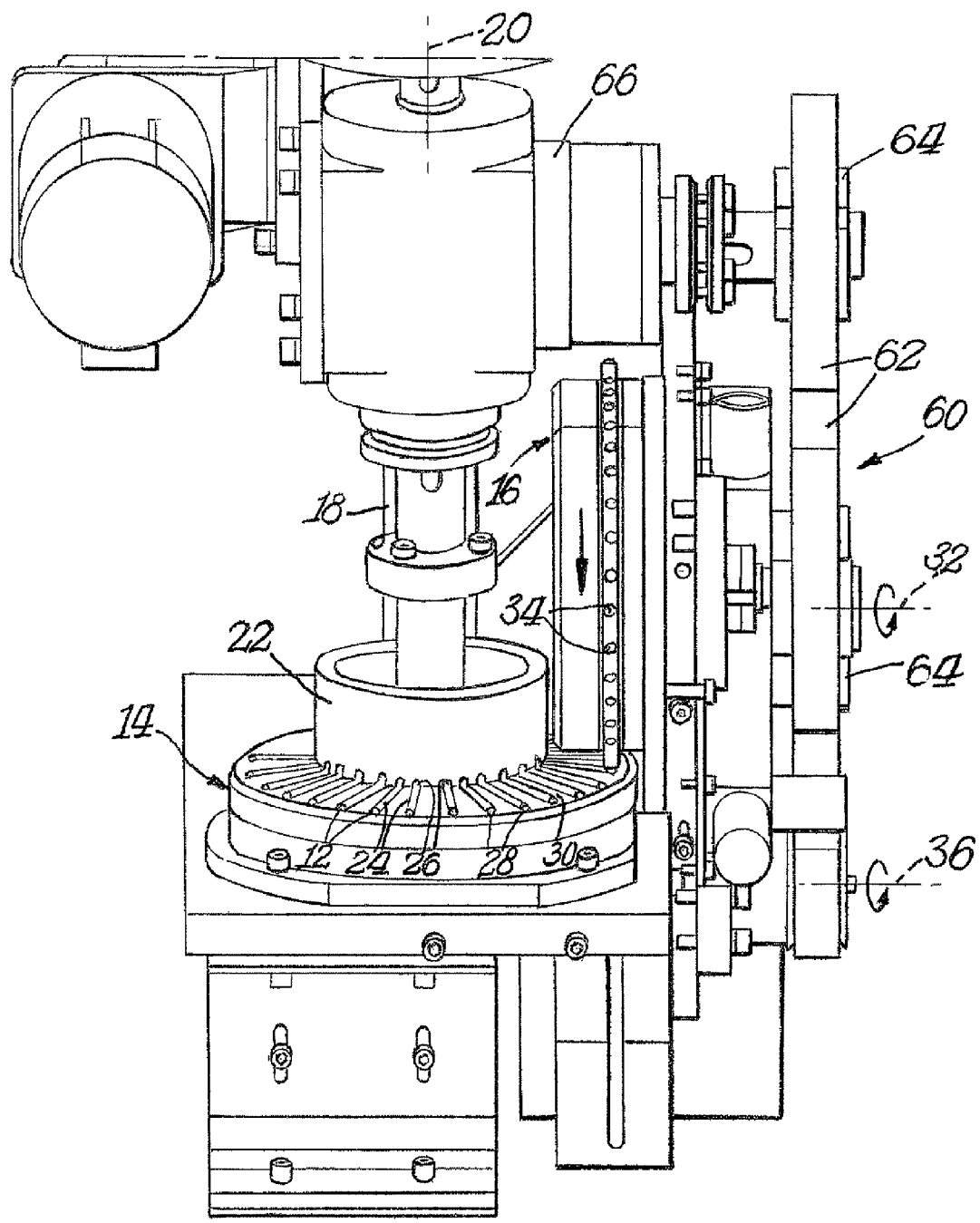
FIG. 1 is a right side elevational view of a bead feeder, in accordance with the present invention.
Figure 2:
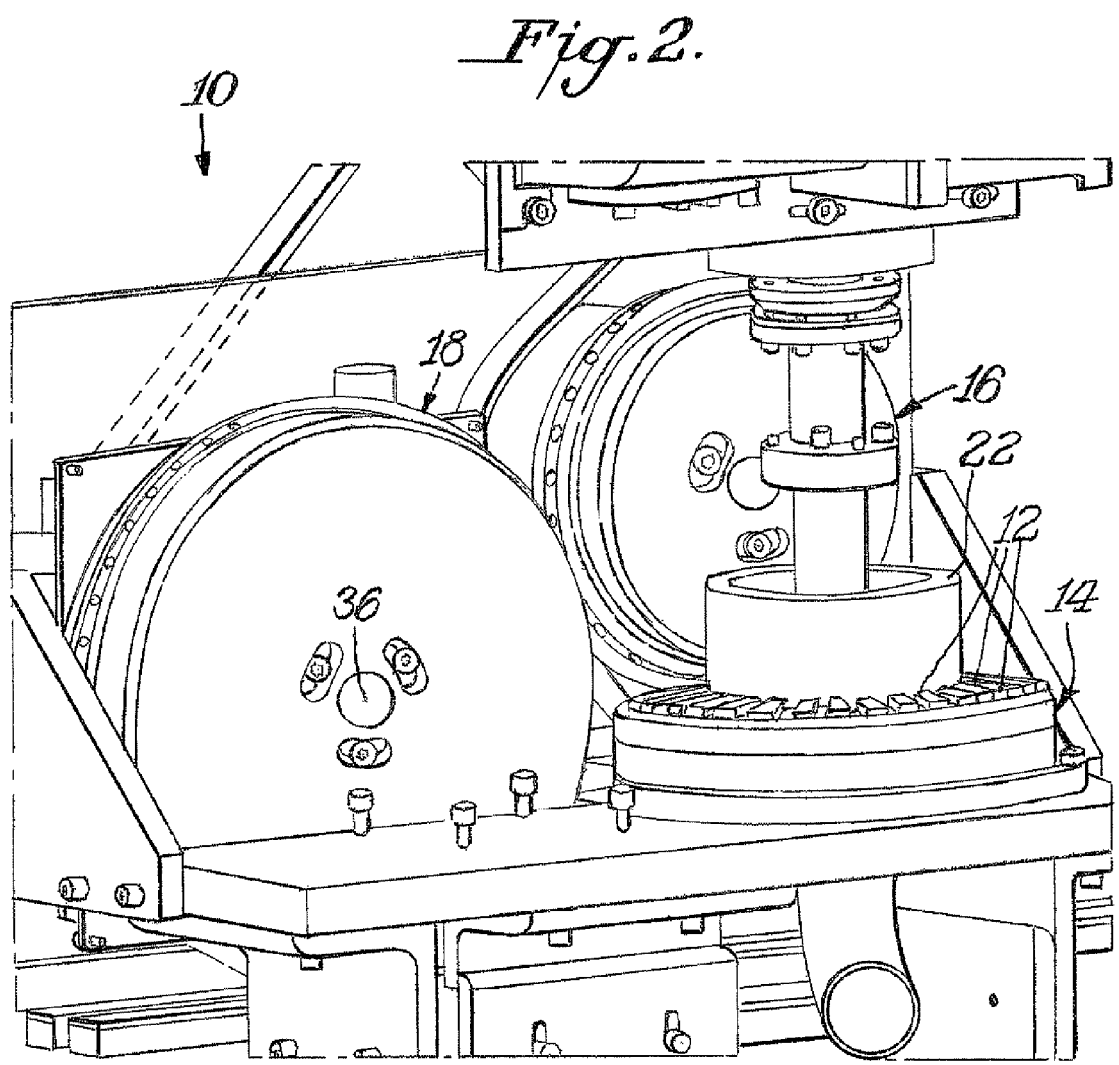
FIG. 2 is a front elevational perspective view of the bead feeder shown in FIG. 1.

Referring in more particularity to the drawings, FIGS. 1-3 illustrate a bead feeder 10 for serially delivering beads 12 to a downstream location. As explained more fully below, such downstream location may be the space or cavity between spaced apart cellulose acetate plugs in the production of so-called plug-space-plug cigarette filters.

Throughout this description the term bead is utilized which is intended to include spherical configurations as well as spherically ended components.

The bead feeder of the present invention includes three major components which include a bead supply wheel 14, a bead transfer wheel 16 and a bead delivery wheel 18. Collectively these wheels rotate in sequence with one another so as to serially deliver the beads 12 in a downstream direction.

The bead supply wheel 14 is connected to rotate about a substantially vertical axis 20. Supply wheel 14 includes a bead supply bowl 22 and a plurality of radially arranged channels 24 below the bowl, and both the bowl and channels rotate about the vertical axis 20. The bowl 22 includes a plurality of discharge openings 26 spaced around a lower portion thereof with each opening in alignment with the inner end of one of the radially arranged channels. Each of the discharge openings functions to supply each of the channels with the beads 12. A bead receiving pocket 28 is positioned at the outer end of each channel 24 for receiving an individual bead. A cover 30 may be provided over the channels 24, but the beads in the pockets 28 are not covered.

The bead transfer wheel 16 of bead feeder 10 is connected to rotate about a substantially horizontal axis 32. The transfer wheel has a plurality of equally spaced apart bead transfer pockets 34 on the outer surface thereof, and these pockets register with the bead receiving pockets 28 on the supply wheel 14 as the bead supply wheel 14 and the transfer wheel 16 rotate about their respective axes 20, 32.

Vacuum is connected to selected bead transfer pockets 34 to effect transfer of the beads from the bead supply wheel 14 to the bead transfer wheel 16. Fundamentally, vacuum is supplied to the pockets 34 on the transfer wheel 16 when those pockets engage and receive the beads 12 on the bead receiving pockets 28 of the supply wheel. That vacuum continues until the beads are later transferred to the bead delivery wheel 18.

The bead delivery wheel 18 of the bead feeder 10 is connected to rotate about a substantially horizontal axis 36 parallel to the axis 32 of the transfer wheel 16. The bead delivery wheel 18 receives beads 12 from the transfer wheel 16 and serially delivers the beads to a desired downstream location. The bead delivery wheel 18 includes a plurality of bead delivery pockets on the outer surface thereof and these pockets 38 are arranged to register with the bead transfer pockets 34 as the bead transfer wheel 16 and the bead delivery wheel 18 rotate about their respective axes 32, 36.

At the point of transfer of the beads 12 from the transfer wheel 16 to the delivery wheel 18, the vacuum to the respective pocket 34 on the transfer wheel is interrupted and vacuum is applied to the opposite pocket 38 on the delivery wheel 18. Such vacuum continues on the delivery wheel 18 until the bead reaches the point of discharge from the delivery wheel whereupon the vacuum is interrupted to accomplish such discharge of the bead.

In one application of the present invention a moving garniture 40 of a machine for producing cigarette filters is in alignment with and directly below the bead delivery wheel 18, as shown best in FIG. 3. The garniture 40 functions to transport filter paper 42 with equally spaced apart plugs 44 on the paper. Alternatively, the plugs 44 could be unevenly spaced apart, and in that case the delivery wheel pitch would be designed to synchronize with the cavities between the plugs. The plugs 44 may be made of cellulose acetate with appropriate binder, but other plug materials are equally acceptable depending upon the desired cigarette filter construction. The downstream location to which the beads 12 are delivered by the bead delivery wheel 18 of the bead feeder 10 comprise cavities or spaces 46 between the plugs 44. Ultimately after a bead is inserted into a cavity 46, the garniture functions to close the filter paper around the plugs and the beads, and after sealing the paper with adhesive along the longitudinal edges thereof the continuous filter composite is cut into individual plug-space-plug filters which are subsequently joined to wrapped tobacco rods.

A stationary stripper 50 may be positioned as shown in FIG. 3 adjacent the bead delivery wheel 18. The stripper is constructed and arranged to remove beads 12 from the pockets 38 of the bead delivery wheel 18. Additionally, the stripper may function to interrupt the vacuum supply to the bead delivery pockets 38 to assist in removal of the beads from the pockets and discharge thereof into the cavities 46. A single bead is delivered to each of the cavities.

A drive mechanism 60 for rotating the wheels 14, 16 and 18 comprises belts 62, pulleys 64 and transmission 66 arranged to insure that the bead receiving pockets 28 of the bead supply wheel 14 register with the bead transfer pockets 34 of the transfer wheel 16. Also, the drive mechanism 60 provides proper registration of the pockets 34 on the transfer wheel with the bead delivery pockets 38 of the delivery wheel 18.

What is claimed is:

1. A bead feeder for serially delivering beads to a downstream location comprising:
    a bead supply wheel connected to rotate about a substantially vertical axis;
    the bead supply wheel including or bead supply bowl and a plurality of radially arranged channels below the bead supply bowl connected to rotate with the bowl;
    a plurality of discharge openings in the bead supply bowl spaced around a lower portion thereof with the openings in alignment with the radially arranged channels for supplying beads to the channels;
    a bead receiving pocket at an outer end of each channel for receiving an individual bead;
    a bead transfer wheel connected to rotate about a substantially horizontal axis having a plurality of bead transfer pockets on an outer surface thereof constructed and arranged to register with the bead receiving pockets on the bead supply wheel as the supply wheel and the transfer wheel rotate about their respective axes;
    vacuum connected to selected bead transfer pockets to effect transfer of the beads from bead supply wheel to the transfer wheel; and
    a bead delivery wheel connected to rotate about a substantially horizontal axis parallel to the axis of the transfer wheel and constructed and arranged to receive beads from the transfer wheel and serially delivers the beads to the downstream location.

2. A bead feeder as in claim 1 including a moving garniture in alignment with and directly below the delivery wheel;
    the garniture transporting filter paper with equally spaced apart plugs on the paper; and
    wherein the downstream location to which the beads are delivered comprise cavities between the plugs.

3. A bead feeder as in claim 2 wherein the delivery wheel is constructed and arranged to deliver a single bead to each cavity.

4. A bead feeder as in claim 1 wherein the bead delivery wheel includes a plurality bead delivery pockets on an outer surface thereof constructed and arranged to register with the bead transfer pockets of the bead transfer wheel as the transfer wheel and the bead delivery wheel rotate about their respective axes.

5. A bead feeder as in claim 4 wherein the bead delivery wheel includes vacuum connected to selected bead delivery pockets to effect delivery of the beads from the transfer wheel to the bead delivery wheel.

6. A bead feeder as in claim 5 including a stationary stripper adjacent the bead delivery wheel constructed and arranged to remove beads from the bead delivery wheel at the downstream location.

7. A method of serially delivering beads to a downstream location comprising:
    rotating a bead supply wheel about a substantially vertical axis;
    the rotating step including rotating a bead supply bowl and a plurality of radially arranged channels below the bead supply bowl connected to rotate with the bowl;
    discharging beads through a plurality of discharge openings in the bead supply bowl spaced around a lower portion thereof while maintaining the openings in alignment with the radially arranged channels for supplying beads to the channels;
    arranging a bead receiving pocket at an outer end of each channel so as to receive an individual bead;

rotating a bead transfer wheel about a substantially horizontal axis such that a plurality of bead transfer pockets on an outer surface register with the bead receiving pockets on the bead supply wheel as the supply wheel and the transfer wheel rotate about their respective axes;

connecting vacuum to selected bead transfer pockets to effect transfer of the beads from the bead supply wheel to the transfer wheel; and rotating a bead delivery wheel about a substantially horizontal axis parallel to the axis of the transfer wheel and constructed such that beads are received from the transfer wheel and serially delivered to the downstream location.

* * * * *

UNITED STATES PATENT AND TRADEMARK OFFICE
CERTIFICATE OF CORRECTION

| | | |
|---|---|---|
| PATENT NO. | : 7,975,877 B2 | Page 1 of 1 |
| APPLICATION NO. | : 12/182410 | |
| DATED | : July 12, 2011 | |
| INVENTOR(S) | : Martin T. Garthaffner et al. | |

It is certified that error appears in the above-identified patent and that said Letters Patent is hereby corrected as shown below:

In the Claims:

At column 4, claim number 1, line number 9, "the bead supply wheel including or bead supply bowl" should read -- the bead supply wheel including a bead supply bowl --

At column 4, claim number 1, line number 24, "effect transfer of the beads from bead supply wheel to" should read -- effect transfer of the beads from the bead supply wheel to --

At column 4, claim number 1, line number 29, "from the transfer wheel and serially delivers the beads to" should read -- from the transfer wheel and serially deliver the beads to --

At column 4, claim number 2, line number 36, "delivered comprise cavities between" should read -- delivered comprises cavities between --

At column 4, claim number 4, line number 41, "wheel includes a plurality bead delivery" should read -- wheel includes a plurality of bead delivery --

Signed and Sealed this
Twenty-third Day of August, 2011

David J. Kappos
*Director of the United States Patent and Trademark Office*